Dec. 1, 1959     R. F. STALLMAN     2,915,346
ROLLER BEARING ASSEMBLY FOR TRACK LAYER ROLLERS
Filed May 9, 1956     2 Sheets-Sheet 1
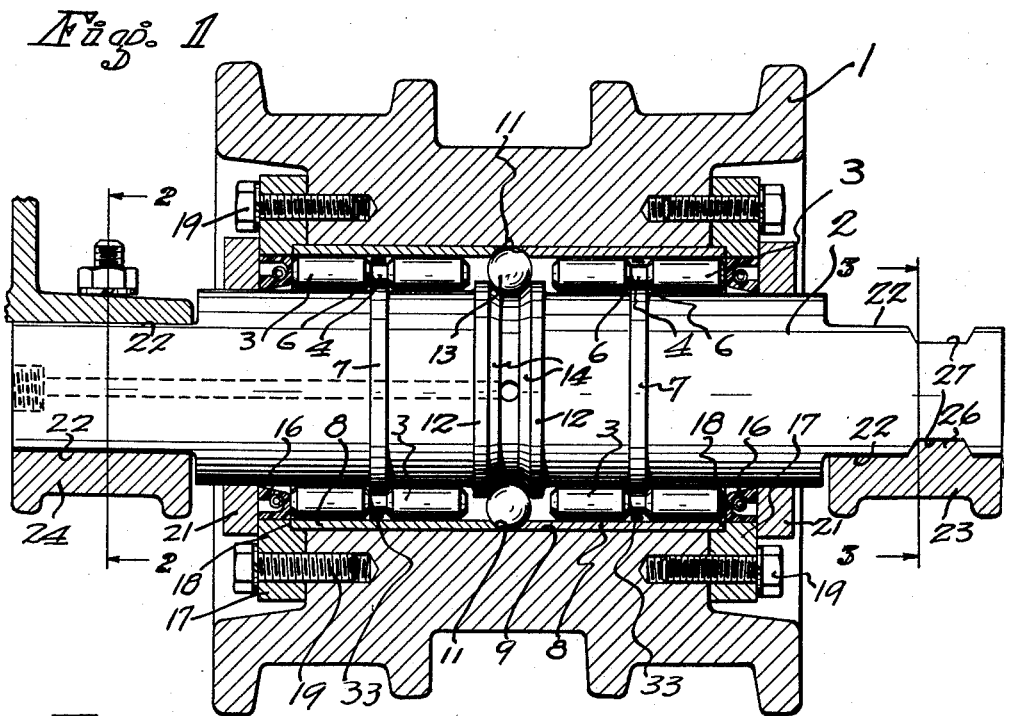
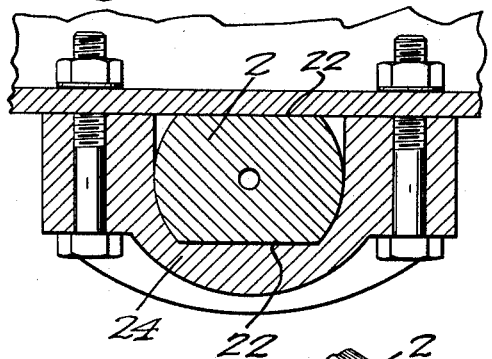
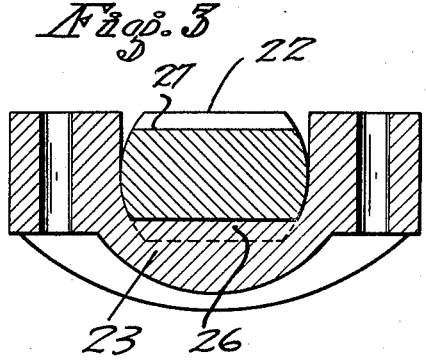
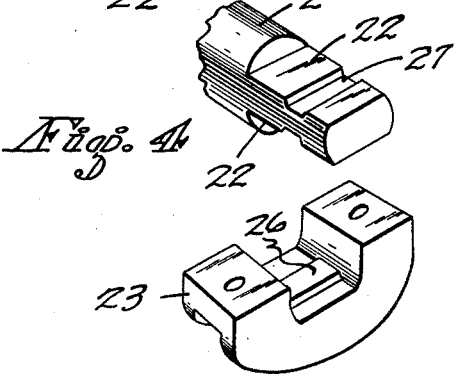
INVENTOR.
RALPH F. STALLMAN
BY George B. White
ATTY.

Dec. 1, 1959   R. F. STALLMAN   2,915,346
ROLLER BEARING ASSEMBLY FOR TRACK LAYER ROLLERS
Filed May 9, 1956   2 Sheets-Sheet 2
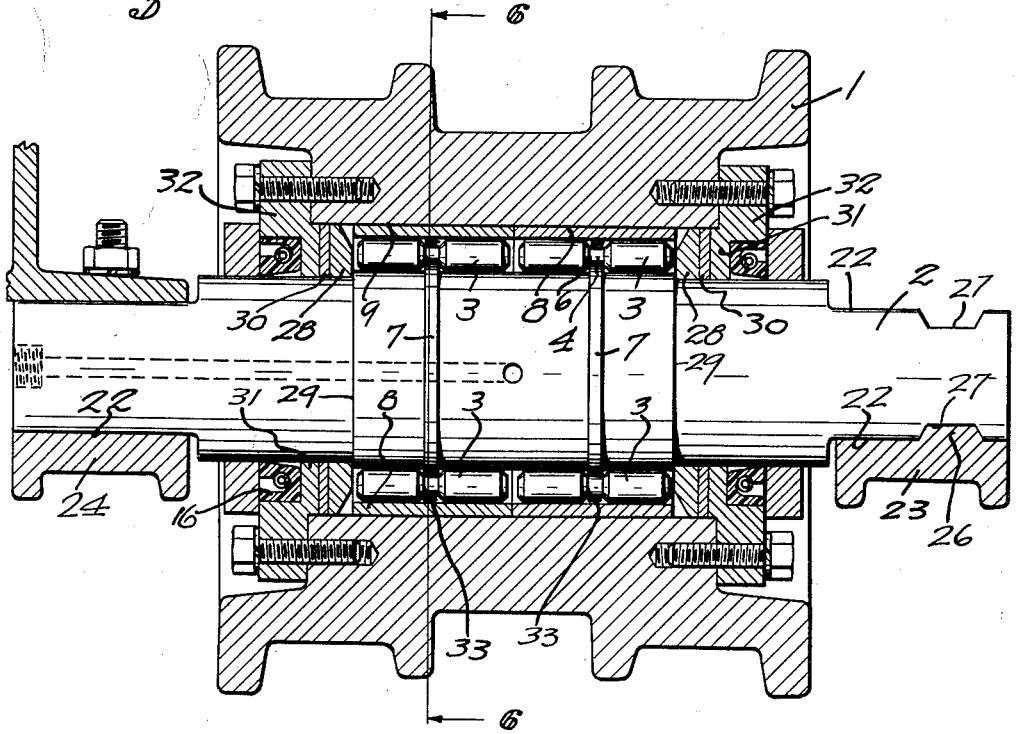
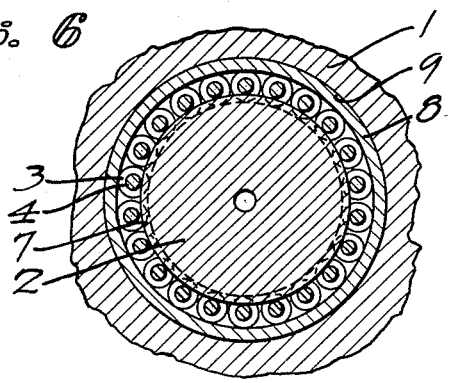
INVENTOR.
RALPH F. STALLMAN
BY George B. White
ATTY.

United States Patent Office 2,915,346
Patented Dec. 1, 1959

2,915,346
ROLLER BEARING ASSEMBLY FOR TRACK LAYER ROLLERS
Ralph F. Stallman, Oakland, Calif.
Application May 9, 1956, Serial No. 583,675
3 Claims. (Cl. 308—210)

This invention relates to a roller bearing assembly for track layer rollers.

Track layer tractors have used friction bearings in the so called track rollers in the past because anti-friction or roller bearings were considered unsuitable for such purposes. The space at the bronze bushings and liners used in all these rollers is now standardized and it is not enough to permit an adequate shaft and roller bearings of available type of sufficient strength for economical service.

On new designs larger roller shells are provided to permit the change to suitable roller bearings. There is, however, a tremendous large number of track layer tractors all over the world which could benefit from the use of a satisfactory roller bearing assembly if the same could be fitted into the existing roller shells. Many attempts have been made to apply bearings of past conventional types, but it was found that to get such bearing in the space required for the bearing, the entire roller shell bore had to be increased to the point where the shell was weakened to the breaking point, or in the alternative the shaft had to be decreased to the danger point of shaft failure. Either of these conditions created by adapting such track roller assemblies to receive roller bearings, caused roller failure and therefore proved impractical and uneconomical.

The primary object of this invention is to provide a roller bearing assembly or cartridge or package which can be inserted into and fit within the existing bore of present track roller shells and around the shaft therein, and which can be inserted in assembly without requiring any change of the shell.

Another object of the invention is to provide a roller bearing assembly adapted for insertion into a track roller bore wherein long rollers of small diameter are utilized so as to increase the roller capacity and permit the shaft strength.

Another object of the invention is to provide a roller bearing assembly which can be readily assembled in the track roller so that the shaft may form the inner race to properly guide the rollers of the bearing and in which detachable means are provided on the shell of such track roller for holding the roller bearing assembly in place.

Another object of the invention is to provide, in combination with such roller bearing assembly, a shaft which can be reversed as to load zones; the shaft can be turned and held in one of two positions to present opposite portions in the load zone; thus the life of such shaft is materially increased.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings. With the foregoing and other objects in view, which will be made manifest in the following detailed description, reference is had to the accompanying drawings for the illustrative embodiment of the invention, wherein:

Fig. 1 is a cross-sectional view of a track roller shell and my roller bearing assembly therein on a track roller shaft.

Fig. 2 is a cross-sectional view taken on the lines 2—2 of Fig. 1.

Fig. 3 is a cross-sectional view taken on the lines 3—3 of Fig. 1.

Fig. 4 shows the end of the shaft with the opposite double flat portions as it is being lifted out of the lower half of its pillow block.

Fig. 5 is a cross-sectional view of the track roller shell and a modified form of my bearing therein on the roller shaft.

Fig. 6 is a cross-sectional view taken on the lines 6—6 of Fig. 5.

Generally in a track layer type of tractor are several so called bottom track rollers which rollers must roll smoothly so as to allow equal distribution of load along the track laying area. These track rollers rotate around relatively stationary shafts. In each of such track rollers is provided a so called shell denoted by reference number 1 in the drawings herein. Inside of each shell 1 is provided some arrangement to reduce the wear between the shell 1 and a shaft 2 on which the shell 1 rotates.

My invention is directed to a roller bearing assembly which can be easily inserted and assembled into the existing space between a shell 1 and the shaft 2. My roller bearing assembly is so formed as to permit the shaft 2 to be used as the inner race or stationary race of the roller bearing and thus it permits the case hardening of the shaft 2 as well as providing the shaft with the improvements that permit longer life in the use of such shafts. The insertable bearing assembly thus formed permits the conversion or change of the track roller shells to roller bearings without weakening the shell or the shaft, yet reducing the frictional resistance to rotation and increasing the life of both the shell and the shaft.

The roller bearings utilized in the assembly herein described operate on the principle described in my Patent No. 2,334,227, granted on November 16, 1943. Each roller 3 is long and has a reduced portion 4 in the middle of the roller 3. The shoulders 6 at the opposite ends of this reduced portion 4 of each roller 3 are tapered so that they have generally frusto-conical shape. The set or series of rollers 3 surrounds a portion of the shaft 2 within the shell 1.

It is a feature of the herein invention that there are two sets of such bearing rollers around the shaft 2 and within the roller 1 and that these sets or series of bearing rollers are spaced from one another and are arranged generally symmetrically within the track roller shell 1. In order to properly guide the bearing rollers 3 in accordance with the principle of operation described in my said patent, there are provided a pair of spaced guide rails or rings 7 on the shaft so as to project outwardly from the shaft periphery and into the space around the reduced portion of the respective sets of rollers 3. The space between the shoulders 6 of said reduced portions 4 is wider than the width of the guide ring 7 so that the said shoulders 6 do not touch either side of the guide ring 7 until and unless there is misalignment to be corrected as described in my said patent.

In order to render this bearing assembly easily removable or insertable, there are provided outer races 8 each respectively surrounding the respective sets of rollers 3. These outer races 8 are suitably inserted into the central bore 9 of the shell 1 so as to surround the respective sets of rollers 3. The fit of these races 8 in the bore 9 is light or medium, pressfit so that the races 8 rotate with the shell 1.

In the form of the invention shown in Fig. 1 a ball thrust bearing is provided generally in the middle of the bore 9 and between the sets of rollers 3. The inner or adjacent ends of the outer races 8 are spaced from one another and are formed into a generally curved circular outer ball race 11. The shaft 2 is provided with a pair of ball races 12 projecting outwardly from each periphery to form the inner race for the ball thrust bearing. A series of balls 13 are located in the usual manner between the races 11 and 12. The inclined tapered surfaces 14 of the inner races 12 are so tapered that the balls 13 ride on the opposite side race surfaces 14 and do not ride on the periphery of the shaft 3 itself. The ball bearing is so arranged that it takes some of the thrust and operates as a limited thrust bearing in the structure.

The space at the outside end of each set of rollers 3 and at the outer ends of the outer races 8 is sealed by an oil seal ring 16 resiliently held in place around the shaft 2. This oil seal 16 is within an end cover 17 provided at the same end. The end cover 17 has a recess 18 therein for surrounding and engaging the adjacent end of the outer race 8. Each end cover 17 is detachably secured to the adjacent end of the track roller 1 by bolts 19 or the like. Outside of each end cover 17 is provided a so called rock breaker seal 21 held stationary on the shaft 2.

The life of the shaft 2 is increased partly because in the use of my aforedescribed assembly the shaft 2 can be case-hardened, and also the shaft 2 can be turned so as to present different sides to the maximum load. This is accomplished by providing each end of the shaft 2 with a pair of flat surfaces 22 diametrically opposed to one another. These two surfaces are engaged in usual pillow blocks 23 and 24, which in turn are secured suitably upon the frame of the machine. The shaft 2 is held stationary by reason of this engagement of its respective flat surfaces 22 with the corresponding flat portions of the pillow blocks 23 and 24. The pillow block 23 also has a transverse key 26 therein which projects into the respective key ways 27 of the shaft 2. There are two sets of key ways 27 in diametrically opposite positions and in registry with the flats 22 so as to bear the end thrust in either of the two positions of the shaft 2.

In the form of the invention shown in Fig. 5, the shell 1 is provided with two sets of bearing rollers 3 to ride on the guide ring 7 of the shaft 2 in the manner described in connection with the first illustrative embodiment. In this form, however, the central ball thrust bearing is eliminated and the outer races 8 are located so that the adjacent ends of the bearing rollers 3 of the opposite sets are still spaced from one another. The assembly in this form has a thrust collar 28 stationarily held on the shaft 2 as located by a shoulder 29 on the shaft 2 respectively at each end of the respective sets of rollers 3. Outside of each thrust collar 28 is a washer preferably a bronze washer 30, and both are held in place by a boss 31 extended inwardly from the adjacent end cover 32 into the bore 9 of the shell 1. Inside of each end cover 32 is provided an oil seal, heretofore described, and which latter is protected by the relatively stationary rock breaker seal, also heretofore described.

In both illustrative forms of the invention the bearing may be assembled on the shaft 2, and one of the cover plates 17 or 32 is fastened in place at one end of the roller bore 9. Then the entire bearing assembly together with the shaft is inserted from the open end of the bore 9 against the cover plate in place. Then the sealing elements and the other cover plate are put in position. The outer races 8 in this operation are pressed in place as the roller bearing assembly is inserted into the bore 9.

If it is advantageous, then the roller bearing assembly may be assembled partly within the bore 9 of the shell 1. In such event, in Fig. 1, the outer race 8 adjacent the cover plate in place is pressed in the bore 9. Then the other parts of the roller bearing assembly are introduced with the shaft 2 up to the ball race rings 12 and the balls 13 are slipped in place at the adjacent end of the bore 9 and pushed into bore 9 with the shaft 2. Finally the other or remaining outer race 8 is pressed in place and the end cover and seals are fastened as heretofore described.

In the form shown in Fig. 5, the outer races 8 may be first pressed in place and then the shaft 2 with the sets of rollers 3 thereon is inserted as a unit into the outer races 8. To facilitate handling of this roller bearing assembly a retaining ring 33 is provided around each set of bearing rollers 3 surrounding the reduced portions 4 of the sets of rollers 3 from the outside and retaining them on the shaft 2.

My roller bearing assembly herein preferably includes the shaft with the guide rings, or races thereon so as to permit insertion into the present bore of the usual track roller. This permits easy and speedy conversion of present day track rollers from friction bearings to roller bearings, and result in greater efficiency and prolonged utility of such track rollers.

I claim:

1. A shaft for a track roller comprising a portion adapted to rotatably and directly support antifriction rollers in said track roller, a plurality of flat portions on each end of the shaft generally parallel with the axis of the shaft, said flat portions being adapted selectively to engage a flat support to support said shaft in a selected position and to expose a selected side of the shaft to the load of said track roller, and a transverse keyway in each flat portion at least on one end of said shaft adapted to engage a key in said flat support to prevent axial movement of the shaft.

2. A shaft for a track roller comprising a portion adapted to rotatably and directly support antifriction rollers in said track roller, a plurality of flat portions on each end of the shaft generally parallel with the axis of the shaft, said flat portions being adapted selectively to engage a flat support to support said shaft in a selected position and to expose a selected side of the shaft to the load of said track roller, and a transverse keyway in each flat portion at least on one end of said shaft adapted to engage a key in said flat support to prevent axial movement of the shaft, and a pair of longitudinally spaced guide rings on the shaft for guiding rollers of roller bearings.

3. In a journal support for a track roller, a shaft adapted to rotatably and directly support antifriction rollers in said track roller, a pair of diametrically opposed flat postions on each end of the shaft generally parallel with the axis of the shaft, a pillow block at each end of the shaft, a flat support surface in each pillow block, said flat portions being adapted to selectively engage and rest upon the respective flat support, each flat portion at least on one end of shaft having a transverse keyway, and a transverse key on the respective flat support to be engaged by the respective keyway to prevent axial movement of shaft.

References Cited in the file of this patent
UNITED STATES PATENTS

| | | |
|---|---|---|
| 402,988 | Sharpneck | May 7, 1889 |
| 503,296 | Susemihl | Aug. 15, 1893 |
| 1,292,799 | Kendall | Jan. 28, 1919 |
| 1,304,430 | Wickersham | May 20, 1919 |
| 1,403,288 | Cadmus | Jan. 10, 1922 |
| 1,943,998 | Adams | Jan. 16, 1934 |
| 1,982,729 | Eberhard | Dec. 4, 1934 |
| 2,094,251 | Young | Sept. 28, 1937 |
| 2,334,227 | Stallman | Nov. 16, 1943 |
| 2,747,949 | Smith | May 29, 1956 |
| 2,809,077 | Christensen | Oct. 8, 1957 |